US011033144B2

(12) United States Patent
Nelson

(10) Patent No.: US 11,033,144 B2
(45) Date of Patent: Jun. 15, 2021

(54) COOK-TO-ORDER GRILL AND GRILL METHOD

(71) Applicant: TAYLOR COMMERCIAL FOODSERVICE, LLC, Rockton, IL (US)

(72) Inventor: Dennis J. Nelson, Rockford, IL (US)

(73) Assignee: TAYLOR COMMERCIAL FOODSERVICE, LLC, Rockton, IL (US)

(*) Notice: Subject to any disclaimer, the term of this patent is extended or adjusted under 35 U.S.C. 154(b) by 257 days.

(21) Appl. No.: 16/150,542

(22) Filed: Oct. 3, 2018

(65) Prior Publication Data

US 2019/0104883 A1  Apr. 11, 2019

Related U.S. Application Data

(60) Provisional application No. 62/568,393, filed on Oct. 5, 2017.

(51) Int. Cl.
| A47J 37/04 | (2006.01) |
| A47J 44/00 | (2006.01) |
| A47J 37/06 | (2006.01) |

(52) U.S. Cl.
CPC ......... *A47J 37/045* (2013.01); *A47J 37/0611* (2013.01); *A47J 44/00* (2013.01); *A47J 37/044* (2013.01); *A47J 2037/0617* (2013.01)

(58) Field of Classification Search
CPC .... A47J 37/044; A47J 37/045; A47J 37/0611; A47J 44/00; A47J 37/00; A47J 37/04; A21B 1/48; A21B 1/245
See application file for complete search history.

(56) References Cited

U.S. PATENT DOCUMENTS

| 5,388,503 | A | * | 2/1995 | Buerkle | ................... | A21B 1/48 |
| | | | | | | 100/151 |
| 5,713,264 | A | | 2/1998 | Pomara, Jr. | | |
| 5,791,234 | A | | 8/1998 | Newton | | |
| 5,910,207 | A | | 6/1999 | Newton | | |
| 6,016,743 | A | | 1/2000 | Glavan | | |

(Continued)

OTHER PUBLICATIONS

International Search Report and Written Opinion for PCT/US2018/054060, dated Jan. 21, 2019, 13 pp.

(Continued)

*Primary Examiner* — Brian W Jennison
(74) *Attorney, Agent, or Firm* — Barnes & Thornburg LLP

(57) ABSTRACT

A grill is provided. The grill comprising: an oven configured to maintain a holding temperature within the oven; one or more grilling stations located in the oven, each of the one or more grilling stations comprising: an upper platen assembly including an upper grilling plate; a lower platen assembly including a lower grilling plate opposite the upper grilling plate, the upper grilling plate being separated from the lower grilling plate by a distance; one or more actuators operably connected to at least one of the upper platen assembly and the lower platen assembly, wherein the one or more actuators are configured to adjust the distance; and a conveyor belt located between the upper grilling plate and the lower grilling plate, wherein the conveyer belt is configured to move a food product between the upper grilling plate and the lower grilling plate.

16 Claims, 3 Drawing Sheets

(56) References Cited

U.S. PATENT DOCUMENTS

Figure 1:
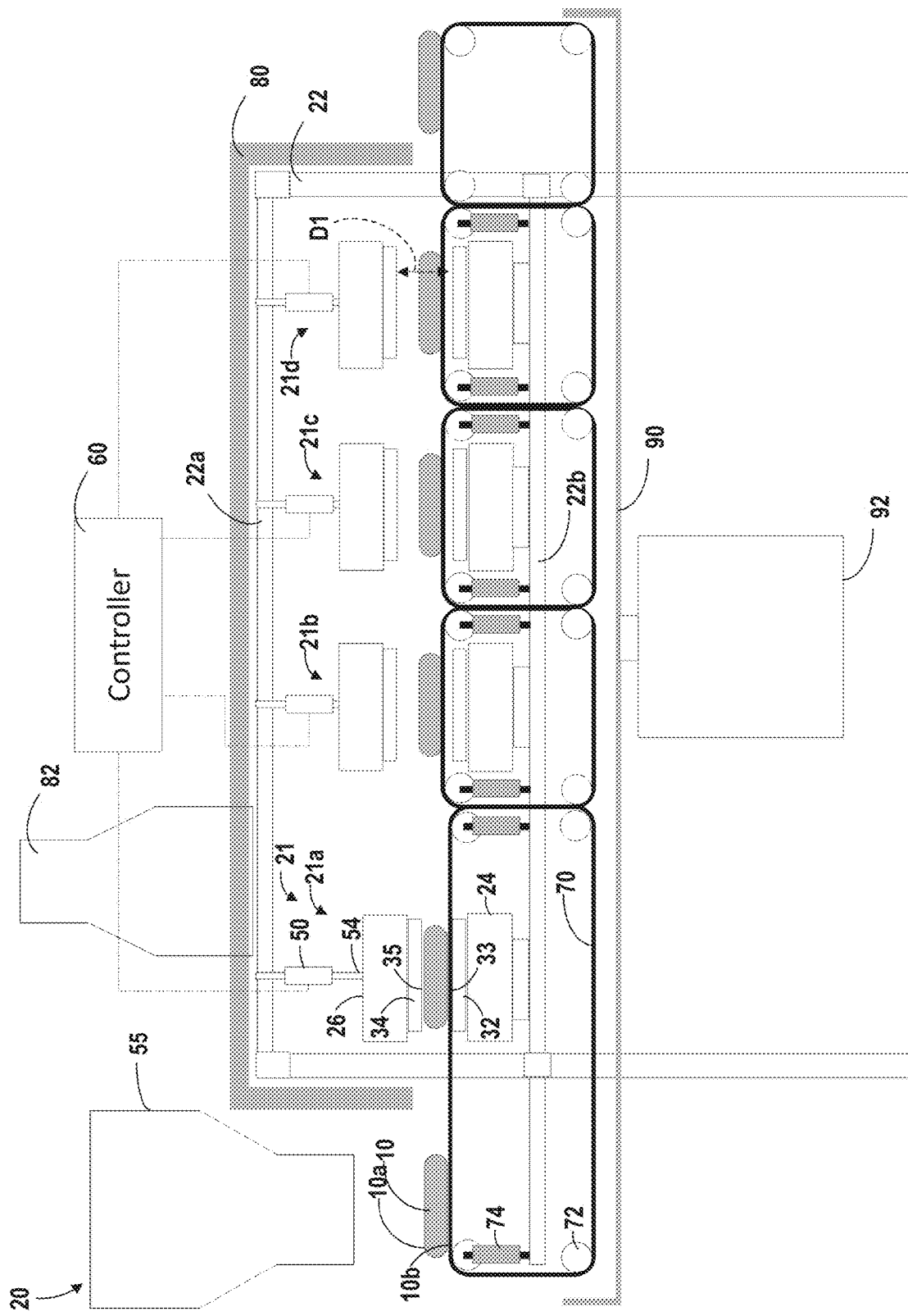

| | | | |
|---|---|---|---|
| RE36,941 E | * | 11/2000 | Wolfe .................... A21B 1/245 |
| | | | 126/21 A |
| 7,448,373 B2 | | 11/2008 | Hill |
| 7,472,645 B2 | | 1/2009 | Hill |
| 9,861,230 B2 | | 1/2018 | Freymiller |
| 9,927,382 B2 | | 3/2018 | Freymiller |
| 10,010,218 B2 | | 7/2018 | Sands |
| 10,098,499 B2 | | 10/2018 | Nelson |
| 10,117,545 B2 | | 11/2018 | Nelson |
| 10,159,379 B2 | | 12/2018 | Nelson |
| 10,213,050 B2 | | 2/2019 | Freymiller |
| 2004/0177770 A1 | | 9/2004 | Verveniotis |
| 2013/0071534 A1 | | 3/2013 | Newton |
| 2015/0108110 A1 | | 4/2015 | Freymiller |
| 2015/0305557 A1 | | 10/2015 | Nelson |
| 2016/0037967 A1 | | 2/2016 | Glavan |
| 2016/0045066 A1 | | 2/2016 | Sands |
| 2016/0309941 A1 | | 10/2016 | Minard |
| 2017/0099987 A1 | | 4/2017 | Patel et al. |
| 2018/0360269 A1 | | 12/2018 | Sands |
| 2019/0038073 A1 | | 2/2019 | Nelson |
| 2019/0045972 A1 | | 2/2019 | Freymiller |
| 2019/0059643 A1 | | 2/2019 | Minard |
| 2019/0075966 A1 | | 3/2019 | Kelly |
| 2019/0104885 A1 | | 4/2019 | Pahnke |
| 2019/0117019 A1 | | 5/2019 | Minard |

OTHER PUBLICATIONS

International Preliminary Report on Patentability for International Patent Application No. PCT/US2018/054060, dated Apr. 16, 2020.
European Examination Report for EP Application No. 18 795 851.7, dated Mar. 26, 2021.

\* cited by examiner

COOK-TO-ORDER GRILL AND GRILL METHOD

CROSS-REFERENCE TO RELATED APPLICATIONS

This application claims priority from U.S. Provisional Application No. 62/568,393, filed on Oct. 5, 2017, the entirety of which is hereby fully incorporated by reference herein.

BACKGROUND

The subject matter disclosed herein generally relates to automated grills, and more particularly, to a system and method of automation of cooking food product.

Cooking meat, vegan, vegetarian, and/or seafood is often labor intensive and requires a person to form, transfer, handle and/or interact with the food product and monitor the food product throughout the cooking process. Variations in cooking expertise and style may often lead to differences in uniformity of the final product (i.e. the cooked food product). Improvements are desired to both reduce the labor required to cook food product while simultaneously increasing the quality and uniformity of the final product.

BRIEF SUMMARY

According to one embodiment, a grill is provided. The grill comprising: an oven configured to maintain a holding temperature within the oven; one or more grilling stations located in the oven, each of the one or more grilling stations comprising: an upper platen assembly including an upper grilling plate; a lower platen assembly including a lower grilling plate opposite the upper grilling plate, the upper grilling plate being separated from the lower grilling plate by a distance; one or more actuators operably connected to at least one of the upper platen assembly and the lower platen assembly, wherein the one or more actuators are configured to adjust the distance; and a conveyor belt located between the upper grilling plate and the lower grilling plate, wherein the conveyer belt is configured to move a food product between the upper grilling plate and the lower grilling plate.

In addition to one or more of the features described above, or as an alternative, further embodiments may include that at least one of the upper platen assembly and the lower platen assembly moves between a cooking position and a non-cooking position to adjust the distance.

In addition to one or more of the features described above, or as an alternative, further embodiments may include that at least one of the upper grilling plate and the lower grilling plate moves between a cooking position and a non-cooking position to adjust the distance.

In addition to one or more of the features described above, or as an alternative, further embodiments may include that the one or more actuators are operably connected to the upper platen assembly and the lower platen assembly is rigidly connected to a rigid base structure.

In addition to one or more of the features described above, or as an alternative, further embodiments may include that the conveyor belt is movably connected to the rigid base structure such that the conveyor belt is allowed to move downward and touch the lower grilling plate when pressure is applied to the conveyor belt by the upper platen assembly.

In addition to one or more of the features described above, or as an alternative, further embodiments may include that the conveyor belt is movably connected to the rigid base structure through one or more biasing mechanisms.

In addition to one or more of the features described above, or as an alternative, further embodiments may include that each of the one or more biasing mechanisms is operably connected to a roller of the conveyor belt.

In addition to one or more of the features described above, or as an alternative, further embodiments may include that at least one of the upper grilling plate and the lower grilling plate is in physical contact with the food product when in the cooking position.

According to another embodiment, a method of cooking food product is provided. The method comprising: transporting, using one or more conveyor belts, a food product between an upper grilling plate of a first grill station and a lower grilling plate of the first grill station, wherein each of the upper grilling plate and the lower grilling plate are located within an oven; moving, using one or more actuators, at least one of the upper grilling plate and the lower grilling plate from a non-cooking position to a cooking position when the food product is between the upper grilling plate and the lower grilling plate; cooking, using the upper grilling plate, the food product when at least one of the upper grilling plate and the lower grilling plate is in the cooking position; cooking, using the lower grilling plate, the food product when at least one of the upper grilling plate and the lower grilling plate is in the cooking position; moving, using one or more actuators, at least one of the upper grilling plate and the lower grilling plate from the cooking position to the non-cooking position after the food product is cooked to a first degree of doneness; and allowing the food product to remain within the oven for a period of time, wherein the oven is configured to maintain a holding temperature within the oven.

In addition to one or more of the features described above, or as an alternative, further embodiments may include that the holding temperature may be greater than a temperature to prevent bacteria growth in the product but less than a temperature required to cook the food product.

In addition to one or more of the features described above, or as an alternative, further embodiments may include moving, using one or more actuators, at least one of the upper grilling plate and the lower grilling plate from a non-cooking position to a cooking position when the period of time is over; cooking, using the upper grilling plate, the food product when at least one of the upper grilling plate and the lower grilling plate is in the cooking position; cooking, using the lower grilling plate, the food product when at least one of the upper grilling plate and the lower grilling plate is in the cooking position; moving, using one or more actuators, at least one of the upper grilling plate and the lower grilling plate from the cooking position to the non-cooking position after the food product is cooked to a second degree of doneness.

In addition to one or more of the features described above, or as an alternative, further embodiments may include: moving the food product out of the oven when the food product is cooked to a final degree of doneness.

In addition to one or more of the features described above, or as an alternative, further embodiments may include: transporting, using one or more conveyor belts, a food product between an upper grilling plate of a second grill station and a lower grilling plate of the second grill station; moving, using one or more actuators, at least one of the upper grilling plate of the second grill station and the lower grilling plate of the second grill station from a non-cooking position to a cooking position when the food product is between the upper grilling plate of the second grill station and the lower grilling plate of the second grill station and the period of time is over; cooking, using the upper grilling plate of the second grill station, the food product when at least one of the upper grilling plate of the second grill station and the lower grilling plate of the second grill station is in the cooking position; cooking, using the lower grilling plate of the second grill station, the food product when at least one of the upper grilling plate of the second grill station and the lower grilling plate of the second grill station is in the cooking position; and moving, using one or more actuators, at least one of the upper grilling plate of the second grill station and the lower grilling plate of the second grill station from the cooking position to the non-cooking position after the food product is cooked to a second degree of doneness.

In addition to one or more of the features described above, or as an alternative, further embodiments may include that each of the upper grilling plate of the second grill station and the lower grilling plate of the second grill station are located within the oven.

According to another embodiment, a grill is provided. The grill comprising: an upper platen assembly including an upper grilling plate; a lower platen assembly including a lower grilling plate opposite the upper grilling plate, the upper grilling plate being separated from the lower grilling plate by a distance; one or more actuators operably connected to the upper platen assembly, wherein the one or more actuators are configured to adjust the distance; and a conveyor belt located between the upper grilling plate and the lower grilling plate, wherein the conveyer belt is configured to move a food product between the upper grilling plate and the lower grilling plate, wherein the conveyor belt is movably connected to a rigid base structure.

In addition to one or more of the features described above, or as an alternative, further embodiments may include that the upper platen assembly moves between a cooking position and a non-cooking position to adjust the distance.

In addition to one or more of the features described above, or as an alternative, further embodiments may include that the upper grilling plate moves between a cooking position and a non-cooking position to adjust the distance.

In addition to one or more of the features described above, or as an alternative, further embodiments may include that the conveyor belt is movably connected to a rigid base structure such that the conveyor belt is allowed to move downward and touch the lower grilling plate when pressure is applied to the conveyor belt by the upper platen assembly.

In addition to one or more of the features described above, or as an alternative, further embodiments may include that the conveyor belt is movably connected to the rigid base structure through one or more biasing mechanisms.

In addition to one or more of the features described above, or as an alternative, further embodiments may include each of the one or more biasing mechanisms is operably connected to a roller of the conveyor belt.

Technical effects of embodiments of the present disclosure include a system configured to partially cook food products, hold them in a warming oven, and then finish cooking the food product when a fully cooked food product is desired.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
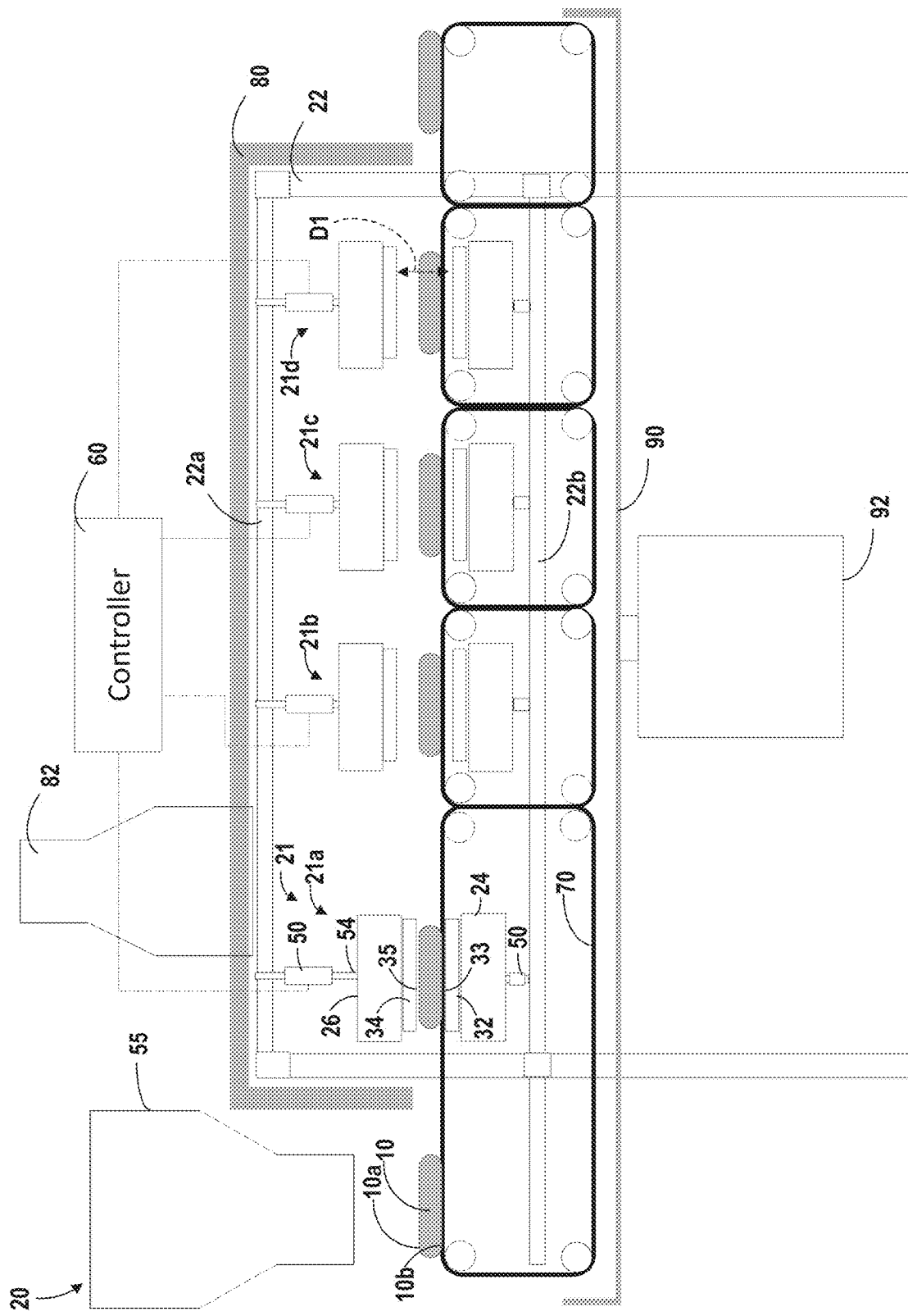
Figure 3:
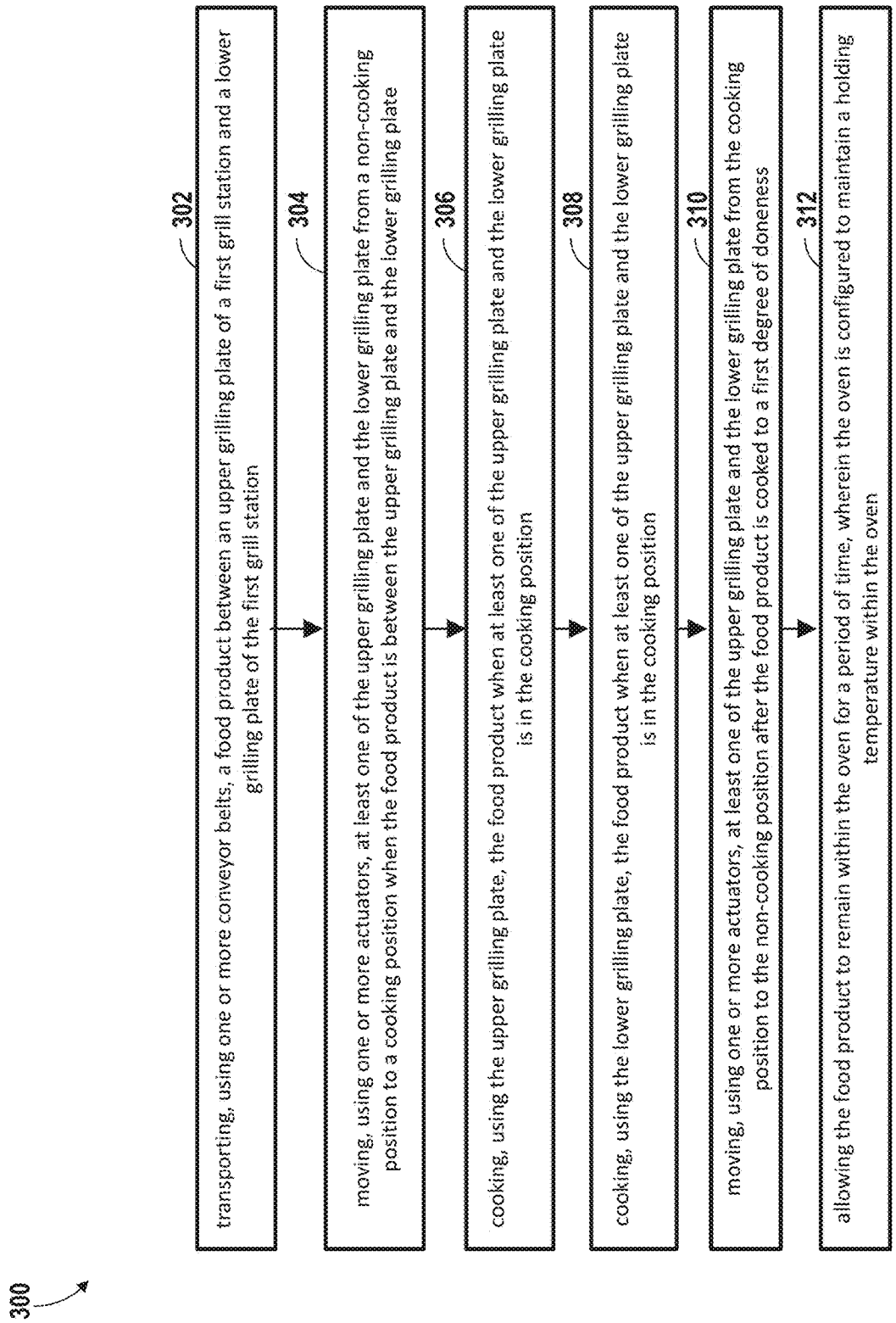

The following descriptions should not be considered limiting in any way. With reference to the accompanying drawings, like elements are numbered alike:

FIG. 1 schematically illustrates a cross-sectional view of a grill, in accordance with an embodiment of the disclosure;

FIG. 2 schematically illustrates a cross-sectional view of a grill, in accordance with an embodiment of the disclosure; and FIG. 3 illustrates a flow diagram illustrating a method of grilling food products, according to an embodiment of the present disclosure.

DETAILED DESCRIPTION

A detailed description of one or more embodiments of the disclosed apparatus and method are presented herein by way of exemplification and not limitation with reference to the Figures.

Referring now to the FIGS., a grill 20 is illustrated including one or more grill stations 21. In the illustrated embodiment, the grill includes four grill stations 21 including a first grill station 21a, a second grill station 21b, a third grill station 21c, and a fourth grill station 21d. It is understood that embodiments disclosed herein are not limited to four grill stations 21 and the grill 20 may include any number of grill stations 21. Each grill station 21 includes a lower platen assembly 24 and an upper platen assembly 26 operably connected to a rigid base structure 22. The rigid base structure 22 may be composed of an upper mounting structure 22a supporting the upper platen assembly 26 and a lower mounting structure 22b supporting the lower platen assembly 24. The lower platen assembly 24 includes a lower grilling plate 32 and the upper platen assembly 26 includes an upper grilling plate 34.

At least one of the upper platen assembly 26 and the lower platen assembly 24 may move from a cooking position seen by the first grill station 21a to a non-cooking position seen by the second grill station 21b, third grill station 21c, and fourth grill station 21d. The cooking position is a position where the upper platen assembly 26 and the lower platen assembly 24 may transfer heat through grilling plates 34, 32 to food products 10. At least one of the upper grilling plate 34 and the lower grilling plate 32 may be in physical contact with the food product 10 when in the cooking position. Heat may be transferred to from the grilling plates 32, 34 to the food products 10 when the upper grilling plate 34 is physically touching the food products 10 and the lower grilling plate 32 is touching the conveyor belt 70. In some embodiments, the cooking position may include multiple positions where the heat may be transferred from the grilling plates 32, 34 to the food product 10 in order to cook the food product 10. For example, at a distance D1 the grilling plates 32, 34 may just be touching the food product 10/conveyor belt 70 in a cooking position; however if the distance D1 is decreased the grilling plates 32, 34 may apply increased pressure to the food product 10 while remaining in a cooking position. Further, the cooking position may also be a position where the upper grilling plate 34 and/or the lower grilling plate 32 are not physical contact with the food product 10 but rather the heat is being transferred from the grilling plates 32, 34 to the food product 10 through a non-contact means, such as, for example an infrared heater.

In a non-limiting embodiment, at least one of the upper grilling plate 34 and the lower grilling plate 32 may be a non-contact heater.

In a non-liming embodiment, both the upper platen assembly 26 and the lower platen assembly 24 move from the cooking position (e.g. as shown by the first grill station 21a) to the non-cooking position (e.g. as shown by the second grill station 21b), as seen in FIG. 2. In another non-limiting embodiment, either one of the upper platen assembly 26 or the lower platen assembly 24 may be fixed while the other moves. In yet another non-limiting embodiment, the upper platen assembly 26 may be fixed and the lower platen assembly 24 may move from the cooking position (e.g. as shown by the first grill station 21a) to the non-cooking position (e.g. as shown by the second grill station 21b). Alternatively, in another non-limiting embodiment, the lower platen assembly 24 may be fixed and the upper platen assembly 26 may move from the cooking position (e.g. as shown by the first grill station 21a) to the non-cooking position (e.g. as shown by the second grill station 21b), as seen in FIG. 1.

The upper platen assembly 26 may be movably attached to the upper mounting structure 22a with one or more actuators 50 such that the upper platen assembly 26 is configured to move between the cooking position (e.g. as shown by the first grill station 21a) to the non-cooking position (e.g. as shown by the second grill station 21b). The upper platen assembly 26 may be vertically lowered and raised in a generally linear motion. Alternatively, the upper platen assembly 26 may be operably connected to the upper structure 22a by a hinged connection (not shown) such that the upper platen assembly 26 is configured to pivot relative to the conveyor belt 70. The actuators 50 may be the hinged connected.

The lower platen assembly 24 may be movably attached to the lower mounting structure 22b with one or more actuators 50 such that the upper platen assembly 26 is configured to move between the cooking position (e.g. as shown by the first grill station 21a) to the non-cooking position (e.g. as shown by the second grill station 21b), as seen in FIG. 2. The lower platen assembly 24 may be vertically lowered and raised in a generally linear motion. Alternatively, the lower platen assembly 24 may be operably connected to the lower structure 22b by a hinged connection (not shown) such that the lower platen assembly 24 is configured to pivot relative to the conveyor belt 70. The actuators 50 may be the hinged connected.

Alternatively, instead of moving the lower platen assembly 24 up so that the lower grilling plate 32 touches the conveyor belt as seen in FIG. 2, the upper platen assembly 26 may apply pressure to the food product 10 to move the conveyor belt 70 downward so that the conveyor belt 70 touches the lower grilling plate 32 as seen in FIG. 1. The conveyor belt 70 may be movably attached to the rigid base structure 22. The conveyor belt 70 may be movably attached to the rigid base structure 22 through one or more basing mechanisms 70. In the embodiment of FIG. 1, a biasing mechanism 74 is operably connected to each roller 72 of the conveyor belt 70 such that the conveyor belt 70 is allowed to move downward and touch the lower grilling plate 32 when pressure is applied to the conveyor belt 70 by the upper platen assembly 26. Advantageously, the biasing mechanisms 70 allows the food product 10 to be thermally disconnected from the lower grilling plate 32 when not in the cooking position as seen by the second grilling position 21b, the third grilling position 21c, and the fourth grilling position 21d in FIG. 1. The biasing mechanism 70 may be a spring in one non-limiting example. In FIG. 1, the lower grilling platen assembly 24 is rigidly connected to the lower structure 22b and the rollers 72 may be movably attached to the lower structure 22b. Whereas, in FIG. 2, the lower grilling plates 32 are movably attached to the lower structure 22b through the actuators 50 and the rollers are rigidly connected to the lower structure 22b (rigid connection not shown).

A food product dispenser 55 may be configured to place each food product 10 on the conveyer belt 70. The food product dispensers 55 may also be configured to form the food product 10 into patties in a non-limiting example. The conveyer belt 70 of each grilling station 21 is configured to move the food products 10 between the lower grilling plate 32 and the upper grilling plate 34 when the at least one of the upper platen assembly 26 and the lower platen assembly 24 is in the non-cooking position. It is understood that the grilling plates 34, 32 may vary in size and thus the number of food products 10 cooked by each grilling station may also change. At least one of the upper platen assembly 26 and the lower platen assembly 24 is moved from the non-cooking position to the cooking position when the food product 10 is in between the lower grilling plate 32 and the upper grilling plate 34. When in the cooking position, the food product 10 is exposed to a grilling surface 35 of the upper grilling plate 32. A heating surface 33 of the lower grilling plate 32 transfers heat to the food product 10 through the conveyor belt 70. The conveyor belt 70 melt be composed of a thermally conductive material such as, for example, steal, relief sheet metal, Teflon, thin stainless steel, or similar conductive and flexible material.

The grilling surface 35 of the upper grilling plate 34 and the heating surface 33 of the lower grilling plate 32 may be separated by a distance D1. Heat is applied to the food product 10 for a selected period of time in order to cook each of the food products 10 to a selected degree of doneness (i.e. rare, medium-rare, medium, medium-well, well-done). The distance D1 may be adjusted automatically or manually during the selected period of time while cooking the food products 10 and also when cooking of the food products 10 is completed. The distance D1 may be adjusted automatically by the actuators 50 through a controller 60 or manually by an operator via the handles 30a, 30b. Advantageously, by adjusting the distance D1, the pressure applied to the food product 10 may be adjusted to control desired cooking techniques. For example, increased pressure (i.e. decreased distance D1) or active compression may be utilized to apply a sear to each of the food product 10 at the beginning of the selected period of time, then the pressure may be decreased (i.e. increased distance D1) for normal cooking during a remaining portion of the selected period of time. Advantageously, active compression may be used to apply pressure at various intervals at any time during the cooking cycle. The frequency, compression amount, and duration may all be programmable through the controller 60 and dependent on the desired product characteristic outputs required (e.g. degree of doneness). The degree of doneness may be, such as, for example, rare, medium-rare, medium, medium-well, and well-done. It is important to note that the degree of doneness may be judged by specific temperatures (e.g. 140° F., 160° F., 180° F. . . . etc.) assigned to the subjective terms of rare, medium-rare, medium, medium-well, and well-done.

The lower grilling plate 32 is configured to provide heat to the lower side 10b of each of the food product 10 located on the conveyor belt 70 and the upper grilling plate 34 is configured to provide heat to an upper side 10a of each of the food product 10 located on the conveyor belt 70. The upper and lower grilling plates 32, 34 are heated by a heater (not shown) to cook the food product 10. In order to transmit heat to the food items cooked by the grill, the lower and upper grilling plates 32, 34, respectively, may be formed of a heat-conducting material, such as cast aluminum, abrasion-resistant steel, cast iron, stainless steel, mild steel, a ceramic material, or other suitable heat conducting materials used in grills. Although the lower and upper grilling plates 32, 34 are shown as having a rectangular shape, one or both of the grilling plates 32, 34 may also be formed into other shapes, such as circular or oval shapes for example.

The actuators 50 may also be used to control the tilt, angle, and/or attitude of the grilling plates 32, 34. Although one actuator 50 is illustrated for each grilling plate 32, 34 the FIGS., embodiments having any number of actuators 50 are within the scope of the invention. For example, one or more actuators 50 may be used. FIGS. 1 and 2 show that the actuators 50 connect the upper platen assembly 26 to the upper mounting structure 22*a* and FIG. 2 shows that the actuators 50 connect the lower platen assembly 24 to the lower mounting structure 22*b;* however a person of ordinary skill in the art may understand that various of types of actuator connections would allow relative movement of grilling plates 32, 34 and the disclosure is not limited to the actuator connection shown in FIGS. 1 and 2. For instance, the actuators 50 may connect the upper platen assembly 26 to the upper grilling plate 34 and the lower platen assembly 24 to the lower grilling plate 32.

The grill 20 include a controller 60 configured to control the operation of the grill 20. The controller 60 may be in electronic communication with the actuators 50, the upper platen assembly 26, the lower platen assembly 24, the upper grilling plate 34, the lower grilling plate 32, the conveyor belt 70, and the food product dispenser 55. The controller 60 may include a processor and memory. For ease of illustration, the processor and memory are not shown in FIGS. 1 and 2. The processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in or operably connected to the path determination system including executable instructions stored therein, for instance, as firmware. The controller 60 is configured to operate the actuators 50, the upper platen assembly 26, the lower platen assembly 24, the upper grilling plate 34, the lower grilling plate 32, the conveyor belt 70, and the food product dispenser 55.

Each actuator 50 may be operated independently by the controller 60. Utilizing multiple actuators 50 on each grilling plate 32, 34 may allow the grilling plates 32, 34 to be arranged in a non-horizontal configuration. Advantageously, arranging the plates in a non-horizontal configuration would allow for enhanced control of grease migration (flow of cooked grease from cooking food products 10). In one embodiment, the actuators 50 are linear actuators, such as hydraulic, pneumatic, or mechanical actuators for example. One or more sensors (not shown) are configured to monitor each of the plurality of actuators 50 and detect the distance D1 between lower grilling plate 32 and the upper grilling plate 34. In one embodiment, the sensors are Hall Effect sensors or encoders configured to monitor the position of a movable portion 54 of the actuators 50. Alternatively, other types of sensors, such as sensors configured to monitor current, load, resistance, or another characteristic of the plurality of actuators 50 for example, is also within the scope of the disclosure. In another embodiment, the motor resistance of each actuator 50 may be used to monitor the position of each actuator 50. For example, the increased motor resistance the increased the compression of the grilling plates 32, 34 and once a maximum resistance is reached, a maximum compression is reached and thus the grilling plates may be in direct contact at the maximum resistance of the motor of each actuator 50. This may be used during the calibration of the upper platen assembly 26 to ensure it is parallel to the lower platen assembly 24. Through the distance D1 may be adjusted to accommodate the variation of thickness of the food products 10 to be cooked on the grill 20. Further, each actuator 50 may apply a positive pressure on the grilling plates 32, 34 and consequently on the food products 10 as they are being cooked on the grill 20, resulting in compression of the food products 10.

The grill 20 may be automatically calibrated to ensure that the distance D1 between the lower grilling plate 32 and the upper grilling plate 34 is maintained at a desired size. By calibrated, it is meant that the upper grilling plate 34 and the lower grilling plate 32 are level to one another to ensure proper cooking of food items. In one example, the grill 20 is calibrated daily to correct any unleveling of the lower grilling plate 32 that may have occurred during the previous day. The calibration of the grill may be done automatically by the grill 20 utilizing the actuators 50 without the need for external tools, gages, or operators.

The grill 20 may have a single conveyor belt 70 for all the grill stations 21(not shown) or a conveyor belt 70 for each grill stations, as seen in FIGS. 1 and 2. A conveyor belt 70 for each grill station 21 may move the food product 10 between the grill stations 21. For instance, the conveyor belt 70 of the first grill station 21*a* may be considered an indexing conveyor belt as it sets the pace for the conveyor belts 70 of the other grill stations 21*b*, 21*c*, 21*d*. Once the food product 10 is placed on the conveyor belt 70 of the first grill station 21*a*, the conveyor belt 70 of the first grill station 21*a* may move the food product 10 in between the grilling plates 34, 32 of the first grill station 21. The conveyor belt 70 of the first grill station 21*a* may pass the food product 10 to a conveyor belt 70 of a later grill station 21*b*, 21*c*, 21*d*. Each grill station 21 is configured to cook the food product 10 a selected degree of doneness.

As seen in FIGS. 1 and 2 each grill station 21 may be enclosed within an oven 80. In an alternate embodiment, a single grill 21 may be located outside of the oven 80 to cook the food product to the final degree of doneness. The oven 80 is configured to maintain a holding temperature such that the food product 10 is kept warm but not being cooked unless a grilling plates 32, 34 are in the cooking position. The holding temperature may be greater than a temperature to prevent bacteria growth in the product 10 but less than a temperature required to cook the food product 10. The holding temperature may be 155° F. in one non-limiting example. In one example, the food product 10 may be partially cooked to a first selected degree of doneness by a grill station 21 when the food product 10 first enters the oven 80. The partially cooked food product 10 may be kept warm in the oven 80 until it is time to fully cook the food product 10 (e.g. an order has been placed for the burger). Then a grill station 21 may cook the food product 10 to a second degree of doneness and the conveyor belt(s) 70 will moved the food product out of the oven. It is understood that the food product 10 may be cooked to the first degree of doneness and then to the second degree of doneness by two separate grill stations 21 or the same single grill station 21. In one example, the conveyor belt 70 of the first grill station 21a may move the food product 10 into the oven and the first grill station 21a may cook the food product 10 to the first degree of doneness, then the food product 10 may be held in the oven for a period of time and the first grill station 21a may cook the food product 10 to the second degree of doneness. In a second example, the conveyor belt 70 of the first grill station 21a may move the food product 10 into the oven and the first grill station 21a may cook the food product 10 to the first degree of doneness, then the food product 10 may be held in the oven for a period of time, moved to the second grill station 21b, and the second grill station 21b may cook the food product 10 to the second degree of doneness. It is understood, that the food product 10 may stop at any grill station 21 to be cooked to any degree of doneness desired. The controller 60 may be configured to control coordination between each grill station 21 to cook each food product 10.

Additionally the grill 20 includes an exhaust hood 82 in fluid connection to the oven 80. The exhaust hood 82 is configured to remove exhaust from the oven 80 and each of the grill stations 21 within the oven 80. The exhaust is a byproduct from the cooking process of the food product 10. Additionally, the grill 20 may include a grease trap 90 configured to capture grease and food particles remaining from the cooking process of the food products 10. The grease trap 90 may be fluidly connected to a grease container 92 configured to store the grease and food particles from the grease trap 90.

Referring now to FIG. 3, with continued reference to FIGS. 1 and 2. FIG. 3 shows a flow chart of method 300 of cooking food products 10, in accordance with an embodiment of the present disclosure.

At block 302, one or more conveyor belt 70 transports a food product 10 in between an upper grilling plate 34 of a first grill station 21a and a lower grilling plate 32 of the first grill station 21. The conveyor belt 70 is located in between the upper grilling plate 34 and the lower grilling plate 32, as seen in FIGS. 1 and 2.

At block 304, one or more actuators 50 move at least one of the upper grilling plate 34 and the lower grilling plate 32 from a non-cooking position to a cooking position when the food product 10 is between the upper grilling plate 34 and the lower grilling plate 32. As mentioned above, the one or more actuators 50 are operably connected to at least one of the upper platen assembly 26 and the lower platen assembly 24. The upper platen assembly 26 including the upper grilling plate 34 and the lower platen assembly 24 including a lower grilling plate 32. Alternatively, the one or more actuators 50 may be operably connected directly to at least one of the upper grilling plate 34 and the lower grilling plate 32. The upper grilling plate 34 and the lower grilling plate 32 are separated by a distance D1.

At block 306, the upper grilling plate 34 cooks the food product 10 when at least one of the upper grilling plate 34 and the lower grilling plate 32 is in the cooking position. At block 308, the lower grilling plate 32 cooks the food product when at least one of the upper grilling plate 34 and the lower grilling plate 32 is in the cooking position. The one or more actuators 50 may adjust the distance D1 during cooking. Advantageously, adjusting the distance D1 adjusts the pressure placed on each of the selected food products 10 by the grilling plates 32, 34.

At block 310, one or more actuators 50 moves at least one of the upper grilling plate 34 and the lower grilling plate 32 from the cooking position to the non-cooking position after the food product 10 is cooked to a first degree of doneness. The first degree of doneness may be enough to cook the food product 10 about 75% in a non-limiting example and then a second degree of doneness may finish cooking the food product 10 the remaining 25% to the final degree of doneness. Each degree of doneness may vary depending upon the final degree of doneness desired, such as, for example, rare, medium-rare, medium, medium-well, and well-done. It is important to note that the degree of doneness may be judged by specific temperatures (e.g. 140° F., 160° F., 180° F. . . . etc.) assigned to the subjective terms of rare, medium-rare, medium, medium-well, and well-done.

At block 312, the food product 10 is allowed to remain within the oven 80 for a period of time. The oven 80 is configured to maintain a holding temperature within the oven 80. The holding temperature may be greater than a temperature to prevent bacteria growth in the product 10 but less than a temperature required to cook the food product 10. During the period of time the food product 10 may be shifted to different grill stations 21 to accommodate or make room for new food product 10 entering the oven 80. The period of time may end when an order is placed for the food product 10, such as, for example by a customer at a register or drive through window. When the period of time is over, the first grill station 21a may finish cooking the food product 10 to the second degree of doneness. Alternatively, the first grill station 21a may transfer the food product 10 to another grill station 21, such as, for example, the second grill station 21b to finish cooking the food product 10 to the second degree of doneness when the period of time is over. The second grill station 21b will finish cooking the food product 10 to the second degree of doneness. The food product 10 may be transferred from one grill station 21 to another via one or more conveyor belts 70. The second degree of doneness may be equal to the final degree of doneness but it is understood that the food product 10 may be moved to one or more additional grill stations 21 to further cook the food product 10 to additional degree of doneness until the final degree of doneness is reached. When the food product 10 has finished cooking to the final degree of doneness, then the food product 10 may be moved out of the oven 80. In an alternative embodiment, the food product 10 may be cooked to final degree of doneness by a grill station 21 located outside of the oven 80 (not shown).

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A grill comprising:
   an oven configured to maintain a holding temperature within the oven;
   one or more grilling stations located in the oven, each of the one or more grilling stations comprising:
   an upper platen assembly including an upper grilling plate;
   a lower platen assembly including a lower grilling plate opposite the upper grilling plate, the upper grilling plate being separated from the lower grilling plate by a distance;
   one or more actuators operably connected to at least one of the upper platen assembly and the lower platen assembly, wherein the one or more actuators are configured to adjust the distance; and
   a conveyor belt located between the upper grilling plate and the lower grilling plate, wherein the conveyer belt is configured to move a food product between the upper grilling plate and the lower grilling plate,
   wherein the one or more actuators are operably connected to the upper platen assembly and the lower platen assembly is rigidly connected to a rigid base structure, wherein the conveyor belt is movably connected to the rigid base structure such that the conveyor belt is allowed to move downward and touch the lower grilling plate when pressure is applied to the conveyor belt by the upper platen assembly, wherein the conveyor belt is movably connected to the rigid base structure through one or more biasing mechanisms, wherein each of the one or more biasing mechanisms is operably connected to a roller of the conveyor belt.

2. The grill of claim 1, wherein at least one of the upper platen assembly and the lower platen assembly moves between a cooking position and a non-cooking position to adjust the distance.

3. The grill of claim 1, wherein at least one of the upper grilling plate and the lower grilling plate moves between a cooking position and a non-cooking position to adjust the distance.

4. The grill of claim 2, wherein at least one of the upper grilling plate and the lower grilling plate is in physical contact with the food product when in the cooking position.

5. A method of cooking food product:
   transporting, using one or more conveyor belts, a food product between an upper grilling plate of a first grill station and a lower grilling plate of the first grill station, wherein each of the upper grilling plate and the lower grilling plate are located within an oven, wherein the oven has a rigid base structure;
   moving, using one or more actuators, at least one of the upper grilling plate and the lower grilling plate with respect to the rigid base structure from a non-cooking position to a cooking position when the food product is between the upper grilling plate and the lower grilling plate;
   moving the conveyor belt in a downward direction such that the conveyor belt touches the lower grilling plate when the at least one of the upper grilling plate and the lower grilling plate are in the cooking position due to pressure applied to the conveyor belt by the upper grilling plate, wherein the conveyor belt is movably connected to the rigid base structure through one or more biasing mechanisms, wherein each of the one or more biasing mechanisms are operably connected to a roller of the conveyor belt;
   cooking, using the upper grilling plate, the food product when at least one of the upper grilling plate and the lower grilling plate is in the cooking position;
   cooking, using the lower grilling plate, the food product when at least one of the upper grilling plate and the lower grilling plate is in the cooking position;
   moving, using one or more actuators, at least one of the upper grilling plate and the lower grilling plate from the cooking position to the non-cooking position after the food product is cooked to a first degree of doneness; and
   allowing the food product to remain within the oven for a period of time, wherein the oven is configured to maintain a holding temperature within the oven.

6. The method of claim 5, wherein the holding temperature may be greater than a temperature to prevent bacteria growth in the product but less than a temperature required to cook the food product.

7. The method of claim 5, further comprising:
   moving, using one or more actuators, at least one of the upper grilling plate and the lower grilling plate with respect to the rigid base structure from a non-cooking position to a cooking position when the period of time is over;
   moving the conveyor belt in a downward direction such that the conveyor belt touches the lower grilling plate when the at least one of the upper grilling plate and the lower grilling plate are in the cooking position due to pressure applied to the conveyor belt by the upper grilling plate;
   cooking, using the upper grilling plate, the food product when at least one of the upper grilling plate and the lower grilling plate is in the cooking position;

cooking, using the lower grilling plate, the food product when at least one of the upper grilling plate and the lower grilling plate is in the cooking position;

moving, using one or more actuators, at least one of the upper grilling plate and the lower grilling plate from the cooking position to the non-cooking position after the food product is cooked to a second degree of doneness.

8. The method of claim 7, further comprising:

moving the food product out of the oven when the food product is cooked to a final degree of doneness.

9. The method of claim 5, further comprising:

transporting, using one or more conveyor belts, a food product between an upper grilling plate of a second grill station and a lower grilling plate of the second grill station located within the oven and adjacent to the first grilling station;

moving, using one or more actuators, at least one of the upper grilling plate of the second grill station and the lower grilling plate of the second grill station from a non-cooking position to a cooking position when the food product is between the upper grilling plate of the second grill station and the lower grilling plate of the second grill station and the period of time is over;

moving the conveyor belt in a downward direction such that the conveyor belt touches the lower grilling plate of the second grill station when the at least one of the upper grilling plate of the second grill station and the lower grilling plate of the second grill station are in the cooking position due to pressure applied to the conveyor belt by the upper grilling plate of the second grill station;

cooking, using the upper grilling plate of the second grill station, the food product when at least one of the upper grilling plate of the second grill station and the lower grilling plate of the second grill station is in the cooking position;

cooking, using the lower grilling plate of the second grill station, the food product when at least one of the upper grilling plate of the second grill station and the lower grilling plate of the second grill station is in the cooking position; and moving, using one or more actuators, at least one of the upper grilling plate of the second grill station and the lower grilling plate of the second grill station from the cooking position to the non-cooking position after the food product is cooked to a second degree of doneness.

10. The method of claim 9, wherein each of the upper grilling plate of the second grill station and the lower grilling plate of the second grill station are located within the oven.

11. A grill comprising:

an upper platen assembly including an upper grilling plate;

a lower platen assembly including a lower grilling plate opposite the upper grilling plate, the upper grilling plate being separated from the lower grilling plate by a distance;

one or more actuators operably connected to the upper platen assembly, wherein the one or more actuators are configured to adjust the distance; and a conveyor belt located between the upper grilling plate and the lower grilling plate, wherein the conveyer belt is configured to move a food product between the upper grilling plate and the lower grilling plate, wherein the conveyor belt is movably connected to a rigid base structure, wherein lower platen assembly is rigidly connected to a rigid base structure, wherein the conveyor belt is movably connected to the rigid base structure such that the conveyor belt is allowed to move downward and touch the lower grilling plate when pressure is applied to the conveyor belt by the upper platen assembly, wherein the conveyor belt is movably connected to the rigid base structure through one or more biasing mechanisms, wherein each of the one or more biasing mechanisms is operably connected to a roller of the conveyor belt.

12. The grill of claim 11, wherein the upper platen assembly moves between a cooking position and a non-cooking position to adjust the distance.

13. The grill of claim 11, wherein the upper grilling plate moves between a cooking position and a non-cooking position to adjust the distance.

14. The grill of claim 11, wherein the conveyor belt is movably connected to a rigid base structure such that the conveyor belt is allowed to move downward and touch the lower grilling plate when pressure is applied to the conveyor belt by the upper platen assembly.

15. The grill of claim 11, wherein the conveyor belt is movably connected to the rigid base structure through one or more biasing mechanisms.

16. The grill of claim 15, wherein each of the one or more biasing mechanisms is operably connected to a roller of the conveyor belt.

* * * * *